US012517068B2

(12) United States Patent
Bendahan (10) Patent No.: US 12,517,068 B2
(45) Date of Patent: Jan. 6, 2026

(54) BELOW-GROUND COMPUTED TOMOGRAPHY CARGO INSPECTION SYSTEM AND METHOD

(71) Applicant: SMITHS DETECTION INC., Edgewood, MD (US)

(72) Inventor: Joseph Bendahan, San Jose, CA (US)

(73) Assignee: Smiths Detection Inc., Edgewood, MD (US)

(*) Notice: Subject to any disclaimer, the term of this patent is extended or adjusted under 35 U.S.C. 154(b) by 170 days.

(21) Appl. No.: 17/772,691

(22) PCT Filed: Oct. 30, 2020

(86) PCT No.: PCT/US2020/058121
§ 371 (c)(1),
(2) Date: Apr. 28, 2022

(87) PCT Pub. No.: WO2021/087208
PCT Pub. Date: May 6, 2021

(65) Prior Publication Data
US 2022/0390391 A1 Dec. 8, 2022

Related U.S. Application Data

(60) Provisional application No. 62/928,782, filed on Oct. 31, 2019.

(51) Int. Cl.
*G01N 23/046* (2018.01)
*G01N 23/05* (2006.01)
(Continued)

(52) U.S. Cl.
CPC .......... *G01N 23/10* (2013.01); *G01N 23/046* (2013.01); *G01N 23/05* (2013.01); *G01N 23/087* (2013.01);
(Continued)

(58) Field of Classification Search
None
See application file for complete search history.

(56) References Cited

U.S. PATENT DOCUMENTS

| 1,594,494 A | * | 8/1926 | Callison | B65G 69/26 |
| | | | | 414/389 |
| 2,826,319 A | * | 3/1958 | Renner | B64F 1/368 |
| | | | | 104/165 |

(Continued)

FOREIGN PATENT DOCUMENTS

| CN | 102188776 A | * | 9/2011 | ............... A61N 5/10 |
| CN | 107093229 A | * | 8/2017 | |

(Continued)

OTHER PUBLICATIONS

Machine translation of CN 102188776 A (Year: 2011).*

(Continued)

*Primary Examiner* — Thomas R Artman
(74) *Attorney, Agent, or Firm* — Armstrong Teasdale LLP (57) ABSTRACT

Described herein are a computed tomography scanning system for inspecting an object and methods incorporating the same. The system includes an imaging assembly including a frame positioned within an underground chamber below a ground surface, a platform coupled to and translatable with respect to the frame, and a stage coupled to and rotatable with respect to the platform. The platform is translatable to raise the object above the ground surface and lower the object below the ground surface when the object is on the stage. The imaging assembly also includes an X-ray source fixed with respect to the frame and configured to emit radiation that is attenuated by the object as the platform translates and the stage rotates, and an X-ray detector fixed with respect to the frame, the X-ray detector configured to (Continued)

detect the radiation transmitted through the object and generate a signal representative of the transmitted radiation.

18 Claims, 4 Drawing Sheets

(51) Int. Cl.
  *G01N 23/087* (2018.01)
  *G01N 23/10* (2018.01)
  *G01V 5/226* (2024.01)

(52) U.S. Cl.
  CPC ......... *G01V 5/226* (2024.01); *G01N 2223/04* (2013.01); *G01N 2223/1016* (2013.01); *G01N 2223/106* (2013.01); *G01N 2223/206* (2013.01); *G01N 2223/316* (2013.01); *G01N 2223/3304* (2013.01); *G01N 2223/3306* (2013.01); *G01N 2223/3307* (2013.01); *G01N 2223/3308* (2013.01); *G01N 2223/419* (2013.01); *G01N 2223/639* (2013.01); *G01N 2223/643* (2013.01); *G01N 2223/66* (2013.01)

(56) References Cited

U.S. PATENT DOCUMENTS

| | | | | |
|---|---|---|---|---|
| 3,689,106 | A * | 9/1972 | Young | B62D 53/00 |
| | | | | 410/1 |
| 4,422,177 | A | 12/1983 | Mastronardi et al. | |
| 7,062,011 | B1 * | 6/2006 | Tybinkowski | G01V 5/226 |
| | | | | 378/57 |
| 7,356,115 | B2 * | 4/2008 | Ford | G01V 5/226 |
| | | | | 378/57 |
| 7,539,283 | B2 * | 5/2009 | Bendahan | G01V 5/226 |
| | | | | 378/57 |
| 8,000,436 | B2 * | 8/2011 | Seppi | G01V 5/226 |
| | | | | 378/57 |
| 8,340,245 | B2 * | 12/2012 | Herranz | G01V 5/226 |
| | | | | 378/57 |
| 9,086,496 | B2 * | 7/2015 | Shedlock | G01N 23/06 |
| 9,188,696 | B2 | 11/2015 | Schafer et al. | |
| 9,625,257 | B2 * | 4/2017 | Christoph | G01N 23/046 |
| 9,689,812 | B2 * | 6/2017 | Garms | G01N 23/046 |
| 9,791,385 | B2 * | 10/2017 | Mertens | G01N 23/046 |
| 10,031,091 | B2 * | 7/2018 | Diehm | G01N 23/04 |
| 10,459,111 | B2 * | 10/2019 | Arodzero | G01T 1/20 |
| 10,585,206 | B2 * | 3/2020 | Bendahan | G01V 5/22 |
| 2004/0109532 | A1 * | 6/2004 | Ford | G01N 23/046 |
| | | | | 378/57 |
| 2008/0181357 | A1 | 7/2008 | Bendahan | |
| 2009/0067575 | A1 | 3/2009 | Seppi et al. | |
| 2011/0058646 | A1 | 3/2011 | Herranz et al. | |
| 2014/0376692 | A1 * | 12/2014 | Schafer | G01V 5/22 |
| | | | | 378/57 |
| 2015/0030121 | A1 | 1/2015 | Christoph et al. | |
| 2015/0139386 | A1 * | 5/2015 | Star-Lack | G01V 5/22 |
| | | | | 378/57 |
| 2015/0160354 | A1 | 6/2015 | Mertens et al. | |
| 2015/0338545 | A1 * | 11/2015 | Arodzero | G01N 23/04 |
| | | | | 378/57 |
| 2016/0109388 | A1 | 4/2016 | Garms et al. | |
| 2018/0031495 | A1 | 2/2018 | Diehm et al. | |
| 2019/0137651 | A1 | 5/2019 | Bendahan | |
| 2022/0390391 | A1 * | 12/2022 | Bendahan | G01N 23/083 |

FOREIGN PATENT DOCUMENTS

| | | | | |
|---|---|---|---|---|
| DE | 10139672 A1 * | 3/2003 | ........... | G01N 23/044 |
| JP | 2003097078 A * | 4/2003 | | |
| KR | 960038024 A * | 11/1996 | ............. | E04H 6/287 |
| WO | WO-2011137899 A1 * | 11/2011 | ............. | B65G 69/26 |

OTHER PUBLICATIONS

Machine translation of CN 107093229 A (Year: 2017).*
European Extended Search Report, Application No. 20881341.0, dated Oct. 26, 2023, 8 pps.
International Search Report and Written Opinion, PCT/US2020/058121, Date of mailing: Feb. 5, 2021, 9 pages.

* cited by examiner

BELOW-GROUND COMPUTED TOMOGRAPHY CARGO INSPECTION SYSTEM AND METHOD

CROSS REFERENCE TO RELATED APPLICATIONS

This application is a national stage application of PCT/US2020/058121 filed on Oct. 30, 2020, which claims priority to U.S. Provisional Patent Application No. 62/928,782 filed on Oct. 31, 2019, the disclosures of which are hereby incorporated by reference herein in their entirety as part of the present application.

BACKGROUND

The embodiments described herein relate generally to cargo inspection systems and methods and, more particularly, to cargo inspection systems that are arranged at least partially below-ground and that incorporate computed tomography (CT) to inspect cargo for contraband and methods for operating the same.

It is well known to use x-rays to image objects and construct two- or three-dimensional images of the interior of an object. For example, computed tomography (CT) can be used to develop a high-quality three-dimensional image of the contents of baggage without physically opening the baggage, such as in airport security screening.

There is a need to scan certain objects, such as air cargo, for security reasons (e.g., to detect dangerous materials), contraband, or other materials of interest. Some air cargo is shipped individually or in small boxes and can be scanned with conventional x-ray scanners or CT systems. However, some cargo is consolidated on pallets, on skids, or in air cargo containers. Although these skids can be scanned with conventional x-ray pallet scanners, some contain multiple small parcels or boxes from multiple vendors and with different contents, such that resulting images are difficult to analyze or contain insufficient information.

At least some known systems for scanning such air cargo containers and skids require a large amount of space and a significant amount of shielding, especially in high-energy scanning systems. The system footprint and cost limit how and where such systems can be used. Some systems may limit the energy of their x-ray source to reduce cost and the shielding requirements, but such systems may suffer from insufficient penetration of the skids. Other systems may have low throughput, which affects the stream of commerce workflow.

Accordingly, there is a need for an imaging system that operates at higher energies suitable for penetrating dense container contents and for generating high-resolution 3-D images, including CT images. It would be also highly desirable for such a system to be cost effective, to have a high throughput suitable for high-traffic air cargo use, and to be appropriately sized (e.g., large enough to accommodate air cargo pallets and small enough for use in a typical scanning environment, such as airport cargo processing facilities).

BRIEF DESCRIPTION

In one aspect, a computed tomography scanning system for inspecting an object is provided. The system includes an imaging assembly including a frame positioned within an underground chamber below a ground surface, a platform coupled to the frame, the platform translatable with respect to the frame, and a stage coupled to the platform. The stage is rotatable with respect to the platform and configured to support the object, and the platform is translatable to raise the object above the ground surface and lower the object below the ground surface when the object is supported by the stage. The imaging assembly also includes at least one X-ray source fixedly positioned with respect to the frame, the at least one X-ray source configured to emit radiation that is attenuated by the object as the platform translates and the stage rotates, and at least one X-ray detector fixedly positioned with respect to the frame, the at least one X-ray detector configured to detect the radiation transmitted through the object and to generate a signal representative of the transmitted radiation.

In another aspect, a computed tomography scanning system for inspecting an object is provided. The computed tomography scanning system includes an imaging assembly including a frame positioned within an underground chamber below a ground surface, a platform coupled to the frame, the platform translatable with respect to the frame, and a stage coupled to the platform. The stage is rotatable with respect to the platform and configured to support the object, and the platform is translatable to raise the object above the ground surface and lower the object below the ground surface when the object is supported by the stage. The imaging assembly also includes at least one radiation source fixedly positioned with respect to the frame, the at least one radiation source configured to emit radiation that is attenuated by the object as the platform translates and the stage rotates, and at least one radiation detector fixedly positioned with respect to the frame, the at least one radiation detector configured to detect the radiation transmitted through the object and to generate a signal representative of the transmitted radiation.

In a further aspect, a computed tomography scanning system for inspecting an object is provided. The computed tomography scanning system includes an imaging assembly positioned within an underground chamber below a ground surface. The imaging assembly is configured to simultaneously translate the object along an axis and rotate the object about the axis while the object is at least partially below the ground surface, and scan the object using at least one X-ray source fixedly positioned with respect to the object, the at least one X-ray source configured to emit radiation that is attenuated by the object as the object is simultaneously translated and rotated. The imaging assembly is also configured to detect the radiation transmitted through the object using at least one X-ray detector fixedly positioned with respect to the object, and generate a signal representative of the transmitted radiation using the at least one X-ray detector.

DETAILED DESCRIPTION

The present disclosure provides a system and method for effectively inspecting cargo for the presence of contraband including, without limitation, explosive material, nuclear material, shielding material, and/or other contraband. In one embodiment, an X-ray computed tomography (CT) scanning or imaging system is utilized for inspecting cargo for contraband. The present disclosure employs an X-ray CT scanning system having operating parameters, such as spatial resolution, penetration, and/or scanning speeds, that can be tailored for the detection of explosives, nuclear material and/or other contraband.

In the example embodiment, the imaging system is at least partially arranged underground, to leverage the shielding effects of the ground and to reduce an overall footprint and external (i.e., above-ground) shielding requirements. Various improvements to existing systems, including dual-energy scanning, intensity modulations, and secondary scanning, are also provided.

Embodiments of the present disclosure are described below in reference to its application in connection with and operation of a system for inspecting cargo crates, pallets, skids, and/or containers. However, it will be apparent to those skilled in the art and guided by the teachings herein provided that the disclosure is likewise applicable to any suitable system for scanning containers including, without limitation, boxes, drums, and luggage, transported by water, land and/or air, as well as other containers and/or objects. Further, although the present disclosure is described below in reference to its application in connection with and operation of a system incorporating an X-ray computed tomography scanning/imaging system for inspecting cargo crates, pallets, skids, and/or containers, it is apparent to those skilled in the art and guided by the teachings herein provided that any suitable radiation source including, without limitation, neutrons or gamma rays may be used in alternative embodiments.

Figure 1:
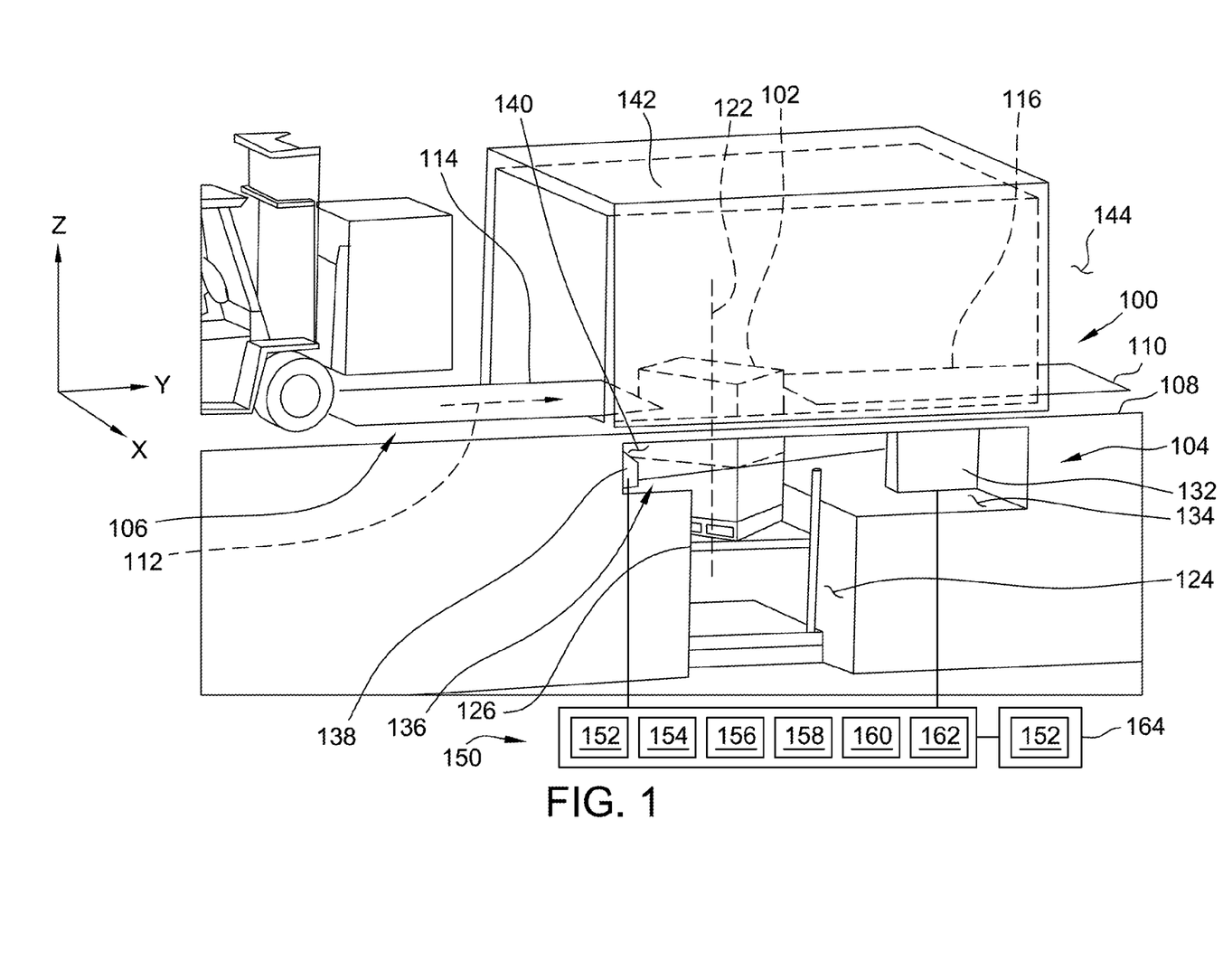
FIG. 1 is a perspective view of an exemplary X-ray computed tomography (CT) scanning system.
Figure 2:
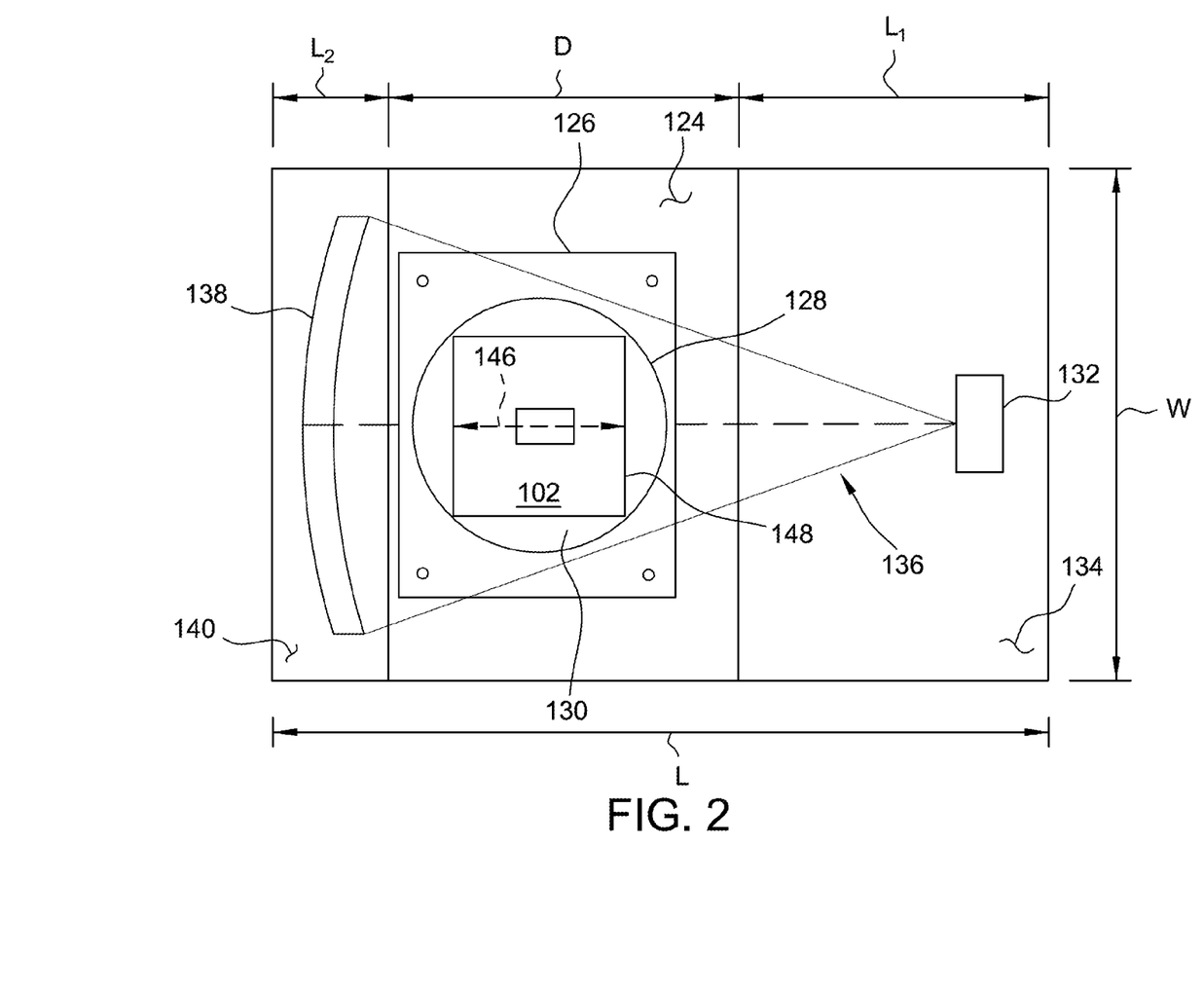
FIG. 2 is a top schematic view of the X-ray CT scanning system shown in FIG. 1.
Figure 3:
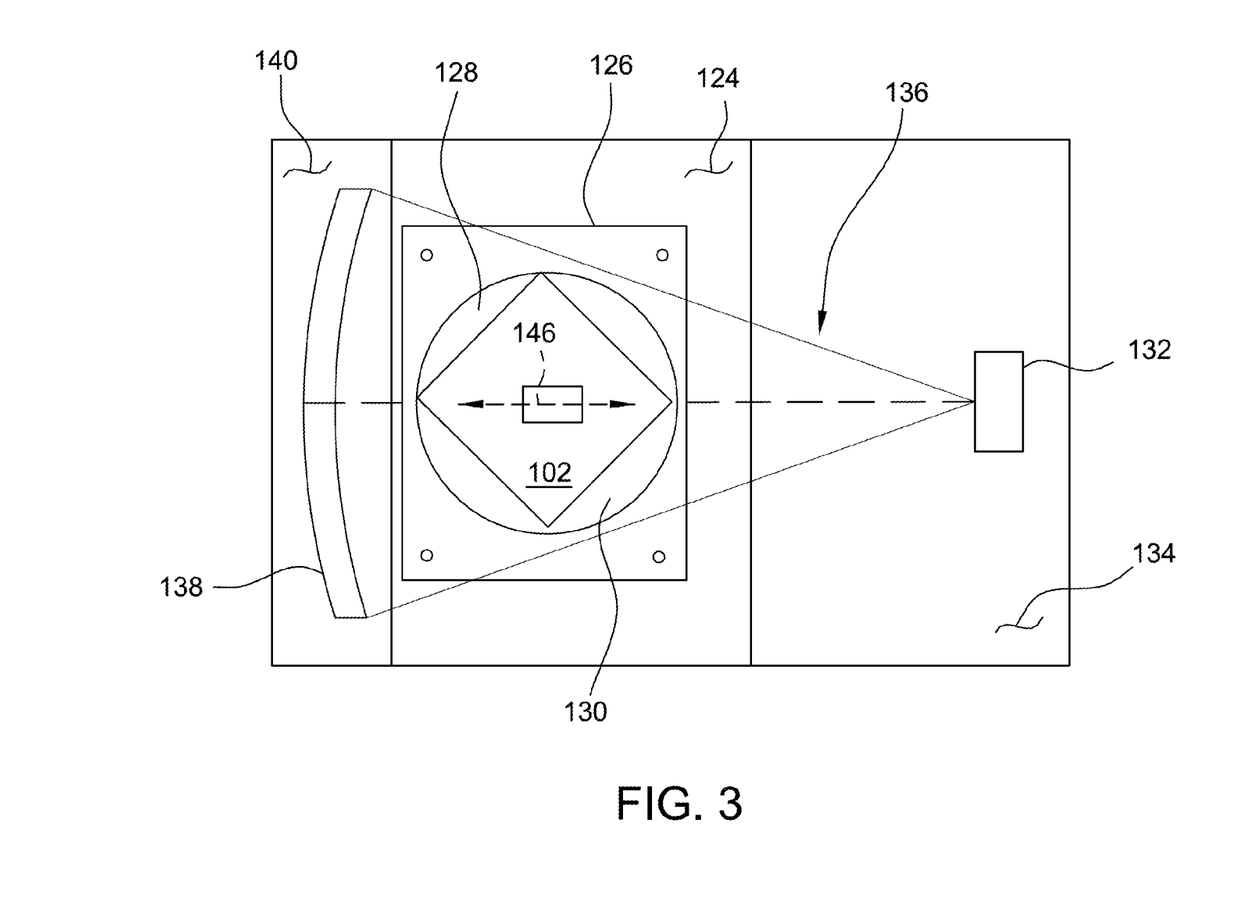
FIG. 3 is another top schematic view of the X-ray CT scanning system shown in FIG. 1.
Figure 4:
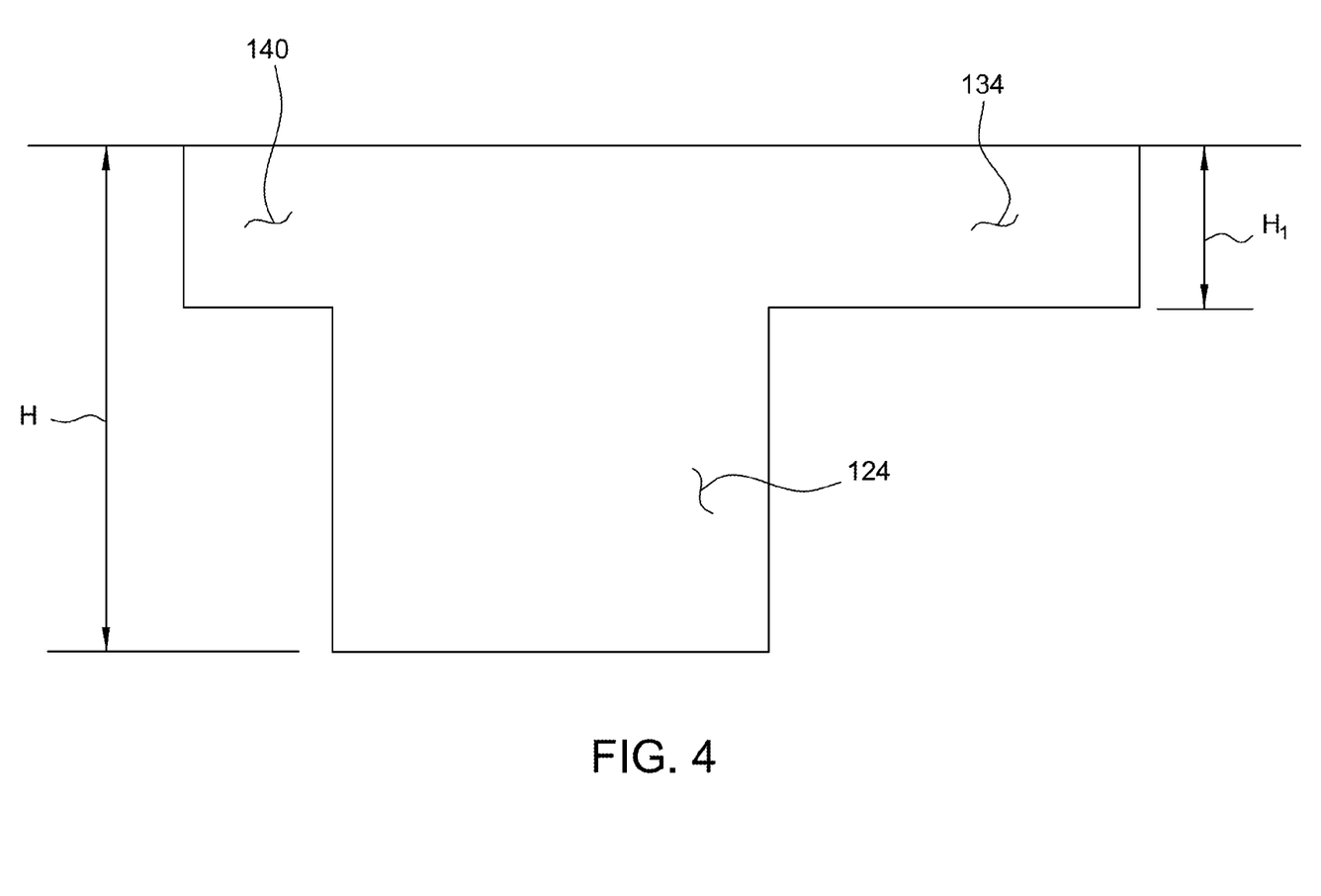
FIG. 4 is a side schematic view of the X-ray CT scanning system shown in FIG. 1.

Turning now to the figures, FIG. 1 is a perspective view of an X-ray computed tomography (CT) scanning system 100 for scanning an object, such as a cargo container 102, skid, box, or drum, to identify the contents and/or determine the type of material contained within container 102. FIGS. 2 and 3 are top schematic views of system 100, and FIG. 4 is a side schematic view of system 100. The term "contents" as used herein refers to any object and/or material contained within container 102 and may include contraband.

System 100 generally includes an imaging assembly 104 and a conveyor assembly 106. As shown best in FIG. 1, system 100 is at least partially positioned underground. In particular, imaging assembly 104 is below a ground surface 108 (e.g., within the ground) and conveyor assembly 106 is at least partially on and/or above ground surface 108.

Conveyor assembly 106 is configured to translate container 102 relative to ground surface 108 using a conveyor 110. Specifically, conveyor assembly 106 is configured to move container 102 along a first axis 112, in a Y-direction. In the illustrated embodiment, conveyor 110 includes at least a first conveyor 114 that moves container 102 towards imaging assembly 104 (e.g., to be scanned by imaging assembly 104), and a second conveyor 116 that moves container 102 away from imaging assembly 104 (e.g., after being scanned by imaging assembly 104). Conveyors 114, 116 may include any conveying system (e.g., rollers) suitable for moving containers 102, including heavy pallets.

Imaging assembly 104 includes a frame 120 defining a second axis 122, in a vertical or Z-direction. Frame 120 is positioned within an underground chamber 124 defined below ground surface 108 to house at least a portion of imaging assembly 104. Imaging assembly 104 also includes a platform 126 that is coupled to frame 120 and is movable with respect to frame 120 in at least one direction. Specifically, platform 126 is movable with respect to frame 120 along second axis 122 or the Z-direction, e.g., in an upward and a downward direction.

Platform 126 includes a rotatable stage 128 defined therein (see FIGS. 2 and 3). Stage 128 is, in the illustrated embodiment, concentric with platform 126. Stage 128 is movable with platform 126 and rotatable with respect to platform 126. In one embodiment, stage 128 is rotatable with respect to platform 126 about second axis 122 in a clockwise and/or a counterclockwise direction, and is movable with platform 126 with respect to frame 120 in the upward and downward direction(s) parallel to second axis 122. As shown in FIGS. 1-3, platform 126—specifically, stage 128—forms a surface 130 for supporting container 102.

Imaging assembly 104 also includes at least one high-energy radiation source fixedly positioned with respect to frame 120 and/or platform 126. In the example embodiment, the high-energy radiation source is embodied as an X-ray source 132 that is fixedly positioned with respect to a first side of frame 120 and/or platform 126. As shown in FIG. 1, X-ray source 132 is positioned within underground chamber 124, specifically within a first sub-chamber 134 thereof.

X-ray source 132 may include any suitable X-ray source, such as a linear accelerator (linac), X-ray tube, and/or any high-energy X-ray generator. In the example embodiment, high-energy X-ray source 132 includes one or more linacs configured to generate pulsed X-rays with high energies on the order of mega-electron volts (MeV). The particular energy of X-rays generated by X-ray source 132 is selected based on the size and density of the container 102 to be inspected, and may range from about 1 MeV to about 10 MeV. Linacs may also produce X-ray pulses with two or more different energies. Where X-ray tubes are used, X-ray source 132 may generate X-rays in a continuous (e.g., non-pulsed) fashion with energies up to about 800 keV. In some embodiments, X-ray source(s) 132 (e.g., one or more linac(s)) are relatively compact, such that the overall size of system 100—and, in particular, first sub-chamber 134—may be minimized. In addition, using compact linacs may reduce the shielding needed for system 100. However, those of skill in the art will appreciate that the system sand methods described herein may also be implemented using larger (i.e., non-compact) linacs. Moreover, in some embodiments, other types of radiation sources (other than linacs) may be used. For example, neutron sources may be used in some embodiments. X-ray source 132 is configured to transmit at least one beam 136 of radiation (i.e., X-rays) through container 102, as described in greater detail below.

Imaging assembly 104 further includes at least one radiation detector, such as an X-ray detector array 138, fixedly positioned with respect to frame 120 and/or platform 126, opposite X-ray source 132. In a particular embodiment, detector array 138 is fixedly positioned with respect to a second side of frame 120 and/or platform 126, the second side opposite to the first side. As shown in FIG. 1, detector array 138 is positioned within underground chamber 124, specifically within a second sub-chamber 140 thereof.

In one embodiment, X-rays are generated by X-ray source 132 and collected at detector array 138 to image container 102 and its contents. Detector array 138 is formed by individual detector elements (not specifically shown), which are radiation detectors that each produce a signal having a magnitude that represents and is dependent on the intensity of the attenuated X-ray beam after it has passed through container 102 being imaged. In the example embodiment, detector array 138 includes any suitable number of detector elements to collect all X-rays generated by X-ray source 132. In the example embodiment, detector array 138 includes a multi-slice detector array including high-energy detector elements specifically configured for collecting high-energy X-rays and arranged in a two-dimensional array. Specifically, detector array 138 includes a multi-slice detector array including a plurality of rows and columns of detector elements. The particular arrangement of the detector elements within detector array 138 and the overall dimensions of detector array 138 can be selected for the particular energy of the X-rays and the desired resolution of the image to be obtained. Detector array 138 is configured to cover an entire field of view or only a portion of the field of view. Further, in some embodiments, detector array 138 may include energy sensitive detectors. In still other embodiments, detector array 138 may include any detector elements suitable to detect other forms of radiation generated by other radiation sources (e.g., neutron radiation).

In operation of imaging assembly 104, X-ray source 132 emits x-rays in an energy range. A primary beam 136 of radiation, such as a fan beam or cone beam, is generated. Primary beam 136 passes through container 102 positioned on platform 126. Detector array 138, positioned on the opposing side of platform 126, measures an intensity of primary beam 136. In one embodiment, detector array 138 measures the x-rays in an energy-sensitive manner by outputting a plurality of electrical output signals dependent on a plurality of energies of x-ray quanta detected from primary beam 136. Upon detection of the radiation from primary beam 136, as attenuated by container 102, detector array 138 (e.g., each detector element thereof) generates a signal representative of the detected attenuated radiation. The signal is transmitted to a control system 150 for processing and analysis, as described below.

In the example embodiment, system 100 further includes a shielding tunnel 142 positioned above underground chamber 124 (and, therefore, above imaging assembly 104) and at least a portion of conveyor assembly 106. Shielding tunnel 142 may be formed from any suitable shielding material (e.g., concrete, lead). Shielding tunnel 142 is configured to shield an environment 144 surrounding system 100 from any scattered radiation, as discussed further herein.

The particular arrangement of imaging assembly 104 in underground chamber 124 with shielding tunnel 142 provides advantages over known container imaging systems. Specifically, higher energy imaging systems (e.g., systems with MeV-level X-ray sources) that are arranged above-ground require a significant footprint and shielding—typically several feet of concrete and/or several inches of lead. It should be readily understood that requiring this amount of shielding can be relatively costly and very large. This shielding can be embodied as an enclosure of the system, which can make the system very heavy and expensive, or by a shielded facility in which the system is placed, which results in a large overall footprint. These disadvantages limit the construction, use, and availability of such systems.

By providing imaging assembly 104 in underground chamber 124 in accordance with the present disclosure, the ground surrounding underground chamber provides at least a portion of the shielding typically performed using concrete and/or lead. Specifically, in the example embodiment, the ground provides a majority of the shielding. Accordingly, shielding tunnel 142 needs only to shield against lower-energy and less intense scattered radiation. As a result, shielding tunnel 142 can be considerably smaller and less expensive than typical shielding structures. In these embodiments, the shielding structure is smaller, less complex, and less expensive than in traditional above-ground, high-energy imaging systems. Accordingly, the overall system 100 of the present disclosure has a smaller footprint and reduced shielding requirements compared to at least some known imaging systems.

It should be readily understood that the illustrated arrangement of frame 120 and platform 126 in (primary) chamber 124, X-ray source 132 in first sub-chamber 134, and detector array 138 in second sub-chamber 140 is not a limiting embodiment. For example, imaging assembly 104 (including frame 120, platform 126, X-ray source 132, and detector array 138) may all be contained in a single chamber, with X-ray source 132 and detector array 138 positioned on fixed, stationary frame structures.

In operation, container 102 is deposited on first conveyor 114 and transferred by first conveyor 114 to platform 126, which is positioned co-planar with ground surface 108 and/or first conveyor 114. Thereafter, platform 126, with container 102 thereon, is translated downward with respect to frame 120 along second axis 122 to lower container 102 into chamber 124. In the example embodiment, container 102 is imaged within chamber 124. In particular, container 102 is imaged while platform 126 is translated along second axis 122 and stage 128 rotated about second axis 122. Any suitable drive assembly known to those skilled in the art and guided by the teachings herein provided may be operatively coupled to platform 126 to provide such actuation and movement with respect to frame 120.

In some embodiments, container 102 is imaged while platform 126 is translated downward along second axis 122. Specifically, platform 126 is translated downward, and container 102 passes between X-ray source 132 and detector array 138. X-ray source 132 is controlled to emit radiation 136, which is attenuated by container 102 and collected by detector array 138. As platform 126 continues to move downward, stage 128 is simultaneously rotated, such that container 102 rotates as container 102 descends through chamber 124. Accordingly, container 102 undergoes a helical scan performed by imaging assembly 104. This helical scanning increases the throughput of system 100, compared to "step and shoot" imaging systems. In one embodiment, stage 128 rotates 360° (or more) in a first rotational direction with respect to platform 126. It should be apparent to those skilled in the art and guided by the teachings herein provided that stage 128 may rotate in either rotational direction and/or for any suitable degree of rotation to facilitate scanning container 102.

Thereafter, platform 126 is translated upward along second axis 122 to raise container 102 through chamber 124. In some embodiments, platform 126 may be raised at a much greater speed than a speed at which platform 126 is lowered, as container 102 is not being scanned. Platform 126 is returned to its original position and is co-planar with ground surface 108 and/or second conveyor 116. Container 102 is transferred to second conveyor 116 (e.g., by controlling platform 126 and/or another transfer element such as a pusher bar, arm, clamp, or the like) and is conveyed away from platform 126 and out of system 100.

In some embodiments, system 100 is operated with the following parameters:

| Parameter | Value (Range) | Value |
|---|---|---|
| Vertical speed of platform 126 during scan | 10 millimeters per second (mm/sec)-20 mm/sec | 13.8 mm/sec |
| Rotational speed of stage 128 during scan | 10 rotations per minute (rpm)-20 rpm | 16.4 rpm |
| Helical pitch of scan | 1-2 | 1.5 |
| Detection capability of detector array 138 | 30 mm/sec-70 mm/sec | 50.24 mm/sec |
| Scan time | 1 minute (min)-3 min | 2 min |
| Conveyor speed | .2 meter per second (m/sec)-1 m/sec | 0.5 m/s |

It should be readily understood that these parameters may vary depending upon, for example, the dimensions of chamber 124 and/or sub-chambers 134, 140 thereof. In one example embodiment in which the above operating parameters may be suitable, chamber 124 has the following dimensions (see FIGS. 2 and 4):

| Dimension | Value (Range) | Value |
|---|---|---|
| Length (L) | 5 meters (m)-7 m | 6.1 m |
| Length ($L_1$) of first sub-chamber 134 | 2 m-3 m | 2 m |
| Length ($L_2$) of second sub-chamber 140 | .5 m-1.5 m | 1 m |
| Distance (D) between sub-chambers | 2 m-3 m | 2.7 m |
| Width (W) | 3 m-5 m | 4 m |
| Height or depth (H) | 2 m-3 m | 2.5 m |
| Height or depth ($H_1$) of sub-chambers | .5 m-1.5 m | 1 m |

The operating parameters of system 100 may further vary based on desired throughput (e.g., speed), image quality, and the like. For a system 100 with the above dimensions and operating parameters, a throughput of about 15 to about 30 containers per hour may be achieved, or about 24 containers per hour.

Although container 102 is described above as being imaged or scanned as platform 126 (and container 102) is lowered, it should be readily understood that container 102 may be imaged or scanned while being raised. For example, platform 126 may be lowered (at a speed faster than a speed of platform 126 during imaging of container 102) to a lowest position, and may be raised while stage 128 is rotated. Container 102 may therefore be raised, rotated, and scanned simultaneously.

In some embodiments of the present disclosure, to increase throughput though system 100, X-ray source 132 is configured for multi-energy scanning, which enables attenuating mapping and atomic-number imaging of container 102. For example, in one embodiment, a plurality of X-ray sources 132 are fixedly positioned with respect to frame 120 and/or platform 126 (e.g., within first sub-chamber 134) and configured to emit radiation having different energy distributions. In such embodiments, a first or low energy X-ray source 132 generates radiation having an energy distribution of about 4 MeV and below, and a second or high energy source 132 generates radiation having an energy distribution of about 6 MeV. It is apparent to those skilled in the art and guided by the teachings herein provided that the first energy source may generate radiation having an energy distribution greater than about 4 MeV and/or the second energy source may generate radiation having an energy distribution less than about 6 MeV and/or greater than about 6 MeV.

In another embodiment, a single X-ray source 132 is a dual-X-ray source. For example, X-ray source 132 can be controlled to generate radiation "pulses" of different energies (e.g., fan beams of 4 MeV and 6 MeV). Such operation is referred as an "interlaced mode" and may be implemented to obtain an atomic number of the material(s) of and/or within container 102. The maximum frequency of the radiation pulses is dependent on the particular X-ray source 132 used in imaging assembly 104. Higher-frequency pulses increase the speed of imaging container 102 and, therefore, the overall throughput of system 100.

In addition to the production of CT images, multiple-energy scanning enables the production of density maps and atomic number of the object contents. This information allows for an improved identification of the materials contained in container 102. For example, it allows for accurately distinguishing organic materials from steel, and distinguishing copper from uranium. There are two main ways of producing atomic-number images: using energy-sensitive radiation detectors that detect radiation below ~1 MV, and using standard X-ray detectors with dual-energy sources generating radiation above ~5 MV. Energy sensitive detectors may be used with X-ray tube radiation sources, and dual-energy radiation sources such as linacs may be used with standard X-ray detectors.

In one embodiment, dual energy scanning of container 102 includes inspecting container 102 by scanning container 102 at a low energy and then scanning container 102 at a higher energy. The data is collected for the low-energy scan and the high-energy scan to reconstruct the CT, density, and/or atomic number images of container 102 for facilitating identifying the type of material or contraband within container 102 based on the material content of container 102. Alternatively, where X-ray source 132 is a single dual-energy source (e.g., a high-energy, high-frequency linac) as described above, X-ray source 132 generates the low energy x-rays and the high energy x-rays in the interlaced mode such that container 102 is scanned only one time. This approach allows for higher throughput.

In one embodiment, container 102 is scanned with at least one energy distribution. Following analysis of the images, suspicious areas or areas with insufficient penetration are selected for a more detailed scan with modified scanning parameters, as described herein. Improved imaging results may be obtained with longer scanning times and/or improved spatial resolution.

In some embodiments of the present disclosure, imaging assembly 104 is configured to implement intensity modulation of beam 136 of radiation while scanning container 102. Intensity modulation may enable imaging assembly 104 to achieve an optimal balance of intensity of beam 136 and image quality (i.e., penetration through container 102) versus shielding requirements. Specifically, fixed-intensity scans employ a fixed-intensity beam 136 throughout an entirety of the scan. The fixed intensity may be selected to achieve the greatest possible penetration through container 102. However, greater intensity beams 136 require greater shielding, and at least some portions of container 102 may not require such intense radiation to be sufficiently imaged.

In one embodiment, the intensity of beam 136 is modulated based on a path length 146 of beam 136 through container 102. With reference to FIGS. 2 and 3, a path length 146 through is relatively shorter when container 102 is facing X-ray source 132—that is, when a face 148 of container 102 is parallel to a face (not shown) of X-ray source 132. The path length 146 is relatively longer when container 102 is in a diagonal orientation with respect to X-ray source 132, as shown in FIG. 3. Accordingly, the intensity of beam 136 may be lowered to a lowest relative intensity when container 102 is facing X-ray source 132 and raised to a highest relative intensity when container 102 is in the diagonal orientation with respect to X-ray source 132. When container 102 is in any other, intermediate orientation, the intensity may be modulated to any intermediate intensity between the highest and lowest relative intensity. The orientation of container 102 may be determined using one or more sensors, imaging devices, and the like.

Additionally or alternatively, the intensity of beam 136 may be dynamically modulated or adjusted during a scan based on whether container 102 is being adequately imaged. For example, when it is determined that container 102 is not being adequately imaged (e.g., based upon image analysis of a resulting image or data analysis of a previous "slice"), the intensity of beam 136 may be increased until it is determined that container 102 is being adequately imaged. In some cases, it may be determined that penetration of beam 136 through container 102 is greater than necessary (e.g., based upon image analysis of a resulting image or data analysis of a previous "slice"). In such cases, the intensity of beam 136 may be lowered.

Additionally or alternatively, an intensity of beam 136 may be pre-selected and/or pre-adjusted (to a fixed intensity or to a predefined range of intensities from the relative lowest to the relative highest) based on a known or expected contents of container 102.

Additionally or alternatively, a beam 136 may be subject to a filter that decreases an intensity of the beam at the edges of beam 136 (and, therefore, at the edges of container 102), while keeping a center of beam 136 at a relative maximum intensity.

A frequency of a pulsed beam 136 generated by a dual-energy X-ray source 132 may be increased or decreased, in addition to or instead of modulating the intensity of beam 136, to increase or decrease image quality. For example, a frequency of the pulses of beam 136 may be decreased when container 102 is facing X-ray source (e.g., for shorter path lengths 146 of beam 136), and/or a frequency of the pulses of beam 136 may be increased when container 102 is in the diagonal orientation with respect to X-ray source 132 (e.g., for longer path lengths 146 of beam 136).

In some embodiments of the present disclosure, imaging assembly 104 may be configured to re-scan a container 102 when the container 102 has not been sufficiently imaged during the first or primary scan, as described above. For example, certain areas of container 102 may not be fully penetrated during the second scan, or a nature of some contents of container 102 is uncertain or requires additional scrutiny.

In such embodiments, imaging assembly 104 may re-scan container 102 in a secondary scanning operation. The secondary scanning operation may be including scanning container 102 with a highest available energy, a reduced helical pitch (e.g., slower translation of platform 126 and/or slower rotation of stage 128), and/or a greater number of views of container 102. Additionally or alternatively, where a single-energy scan was first performed, as described above, a dual-energy may be performed as the secondary scan to improve material discrimination within container 102.

In some embodiments, container 102 may be first scanned while container 102 is lowered through chamber 124 (between X-ray source 132 and detector array 138), and any necessary secondary scan may be conducted while container 102 is raised through chamber 124. Alternatively, each of the first, primary scan and the secondary scan may be performed while container 102 is being lowered—that is, container 102 may be scanned during a first downward traversal through chamber 124, may be raised back up, and may be scanned again during a second downward traversal through chamber 124.

In one embodiment, one or more collimators (not shown) are positioned between X-ray source 132 and container 102 to collimate X-rays emitted from X-ray source 132 into a suitable beam 136, such as a fan beam or cone beam, to reduce excessive radiation that is not used in imaging container 102 and/or to minimize scattered radiation.

Although system 100 has been described above as employing helical scanning methods, in some embodiments, system 100 (e.g., imaging assembly 104) may be configured to operate in a step-and-shoot mode. In the helical mode, stage 128 is continuously rotated as platform 126 is translated to collect data. In the step-and-shoot mode, container 102 is translated into a first position (e.g., by translating platform 126) to be scanned, without data being collected. Once container 102 is in the proper first position, data is collected as container 102 is rotated. Platform 126 may be translated upwards or downwards between scans.

Imaging assembly 104 and conveyor assembly 106 are controlled by a control system 150 configured to receive signals generated by detector array 138 and produce at least one image of the scanned container 102. In some embodiments, control system 150 is one system configured to perform the functions described herein, including receiving signals, generating images, and controlling components of imaging assembly 104 and conveyor assembly 106. In other embodiments, control system 150 includes two or more separate systems, such as a first system that controls imaging assembly 104 and/or conveyor assembly 106, and a second system (e.g., a data collection system) that receives data from detector array 138 and generates one or more images (e.g., CT number images, atomic number images, etc.).

In one embodiment, control system 150 includes a conveyor controller 152, a source controller 154, a data acquisition system (DAS) 156, an image reconstructor 158, a mass storage system 160, an operator console 162, and a display device 164. Source controller 154 provides power and timing signals to X-ray source(s) 132, and DAS 156 acquires analog data from detector array 138 and converts the data to digital form for subsequent processing. Image reconstructor 158 receives the digitized x-ray data from DAS 156 and performs preprocessing steps on the digitized x-ray data and an image reconstruction process, such that 3-D images of the interior of container 102 (e.g., the interior density of container 102 and/or atomic number images) may be displayed on display device 164 for review by an operator (not shown). Analysis of these images facilitates determining the type of material contained within container 102.

For example, in one embodiment image reconstructor 158 produces at least one attenuation map based upon the signals received from detector array 138. Utilizing the attenuation map(s), at least one image of the contents of container 102 is reconstructed and a CT number, a density and/or an atomic number of the contents is inferred from the reconstructed image(s). When data is collected using a single energy mode, the CT image is analyzed. When data is collected using a multiple energy mode, two or more CT images of the cargo are produced. Based on these CT images, density and/or atomic maps of the cargo can be produced. The CT images, the density and/or atomic number images are analyzed to infer the presence of contraband such as explosives, special nuclear and shielding materials and/or to perform cargo manifest verification.

Conveyor controller 152, source controller 154, DAS 156, image reconstructor 158, and/or operator console 162 may include one or more processors (not specifically shown). As used herein, the term processor is not limited to only integrated circuits referred to in the art as a processor, but broadly refers to a computer, a microcontroller, a microcomputer, a programmable logic controller, an application specific integrated circuit and any other programmable circuit. The processor may also include a storage device and/or an input device, such as a mouse and/or a keyboard.

Conveyor assembly 106 may be controlled by conveyor controller 152, which may define the speed and/or direction of conveyor belts 114, 116. Movement of platform 126 and/or stage 128 is controlled by control system 150, which may also include a platform controller 166. Platform controller 166 provides control signals to platform 126 and/or stage 128 that define the speed of translation of platform 126 and/or the angle and/or speed of rotation of stage 128.

Control system 150 may include additional, fewer, and/or alternative components, including any suitable processing and/or computing component necessary to carry out the methods described herein. For example, control system 150 may: (i) determine an orientation of container 102 with respect to X-ray source 132, (ii) dynamically determine an image quality during a scan to determine whether to increase or decrease an intensity of beam 136, (iii) perform a preliminary analysis of a resulting image to determine whether modulated intensity and/or a secondary scan is needed; and/or (iv) control X-ray source 132 to modulate the intensity of beam 136.

Any aspect of any embodiments described herein may be used in combination. Specifically, the present disclosure is directed to balancing cost, complexity, throughput, and image quality according to the particular application or use of system 100.

The above-described systems and methods facilitate inspecting cargo (including cargo containers and pallets) efficiently and reliably. More specifically, the system and method facilitate effectively inspecting cargo using a high-energy CT scanning system to measure the density and the atomic number of materials and detect contraband with a significant portion of the system (e.g., the imaging assembly) arranged underneath the ground. This arrangement enables reduced cost and above-ground shielding and, therefore, a reduced footprint for an imaging system without reduced or limited imaging capability.

Exemplary embodiments of methods and systems for imaging objects, particularly dense and/or complex objects, are described above in detail. The methods and systems are not limited to the specific embodiments described herein, but rather, components of systems and/or steps of the methods may be used independently and separately from other components and/or steps described herein. Accordingly, the exemplary embodiment can be implemented and used in connection with many other applications not specifically described herein, including those described in U.S. Pat. No. 7,492,862, incorporated herein by reference in its entirety.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computed tomography scanning system for inspecting an object, said computed tomography scanning system comprising:
   an imaging assembly comprising:
      a frame positioned within an underground chamber below a ground surface;
      a platform coupled to said frame, said platform translatable with respect to said frame;
      a stage coupled to said platform, said stage rotatable with respect to said platform and movable with said platform wherein said platform and said stage form a surface for supporting the object, and wherein said platform is translatable to raise the object above the ground surface and lower the object below the ground surface when the object is supported on said surface;
      at least one X-ray source fixedly positioned with respect to said frame within the underground chamber, said at least one X-ray source configured to emit radiation towards at least a portion of the object that is below the ground surface as the object is raised or lowered through the underground chamber below the ground surface, the radiation attenuated by the at least a portion of the object as said platform translates and said stage rotates; and
      at least one X-ray detector fixedly positioned with respect to said frame within the underground chamber, said at least one X-ray detector configured to detect the radiation transmitted through the at least a portion of the object and to generate a signal representative of the transmitted radiation.

2. The computed tomography scanning system in accordance with claim 1, further comprising a conveyor assembly configured to transport the object to and from said platform, wherein said conveyor assembly is positioned above the ground surface.

3. The computed tomography scanning system in accordance with claim 1, further comprising a shielding tunnel enclosing at least a portion of said imaging assembly.

4. The computed tomography scanning system in accordance with claim 1, wherein said at least one X-ray detector comprises i) a multi-slice detector array including a plurality of rows and columns of X-ray detectors and/or ii) at least one energy-sensitive X-ray detector.

5. The computed tomography scanning system in accordance with claim 1, wherein said imaging assembly further comprises at least one detector collimator positioned between the object and said at least one X-ray detector.

6. The computed tomography scanning system in accordance with claim 1, wherein said at least one X-ray source is configured to modulate an intensity of the emitted radiation based on a path length through the object, and wherein said at least one X-ray source is configured to increase the intensity of the emitted radiation as the path length increases and to decrease the intensity as the path length decreases.

7. The computed tomography scanning system in accordance with claim 1, wherein said at least one X-ray source is configured to modulate an intensity of the emitted radiation based on a variable attenuation of the radiation by the object.

8. The computed tomography scanning system in accordance with claim 1, wherein said at least one X-ray source is configured to emit the radiation in a dual-energy interlaced mode, and wherein said at least one X-ray source is configured to modulate a frequency of the emitted radiation based on a path length through the object.

9. The computed tomography scanning system in accordance with claim 1, wherein said computed tomography scanning system is configured to:
scan the object a first time;
determine additional scanning is required; and
scan the object a second time.

10. The computed tomography scanning system in accordance with claim 9, wherein to scan the object the second time, the computed tomography scanning system is configured to at least one of:
scan the object at a slower speed relative to the first time;
scan the object with a reduced helical pitch relative to the first time;
scan the object with increased number of views relative to the first time; and
scan the object with higher-energy radiation relative to the first time.

11. The computed tomography scanning system in accordance with claim 1, further comprising a control system in signal communication with said at least one X-ray detector, said control system configured to receive the generated signals and produce at least one image of the object.

12. The computed tomography scanning system in accordance with claim 11, wherein said control system comprises at least one processor to process the produced at least one image for facilitating determining a material content of the object.

13. The computed tomography scanning system in accordance with claim 11, wherein the at least one image includes a CT number image and/or an atomic number image.

14. The computed tomography scanning system in accordance with claim 1, wherein the object is scanned using one of a helical scan and step-and-shoot scan.

15. The computed tomography scanning system in accordance with claim 1, wherein said at least one X-ray source emits the radiation in an energy range of mega-electron volts (MeV).

16. A computed tomography scanning system for inspecting an object, said computed tomography scanning system comprising:
an imaging assembly comprising:
a frame positioned within an underground chamber below a ground surface;
a platform coupled to said frame, said platform translatable with respect to said frame;
a stage coupled to said platform, said stage rotatable with respect to said platform and movable with said platform, wherein said platform and said stage form a surface for supporting the object, and wherein said platform is translatable to raise the object above the ground surface and lower the object below the ground surface when the object is supported on said surface;
at least one radiation source fixedly positioned with respect to said frame within the underground chamber, said at least one radiation source configured to emit radiation towards at least a portion of the object that is below the ground surface as the object is raised or lowered through the underground chamber below the ground surface, the radiation attenuated by the at least a portion of the object as said platform translates and said stage rotates; and
at least one radiation detector fixedly positioned with respect to said frame within the underground chamber, said at least one radiation detector configured to detect the radiation transmitted through the at least a portion of the object and to generate a signal representative of the transmitted radiation.

17. The computed tomography system in accordance with claim 16, wherein the radiation is X-rays and/or neutrons.

18. A computed tomography scanning system for inspecting an object, said computed tomography scanning system comprising:
an imaging assembly positioned within an underground chamber below a ground surface, said imaging assembly configured to:
simultaneously translate the object along an axis and rotate the object about the axis while the object is supported on a surface formed by a stage and a platform at least partially below the ground surface, the stage rotatable with respect to and movable with the platform;
scan at least a portion of the object that is below the ground surface using at least one X-ray source fixedly positioned with respect to the object and within the underground chamber, the radiation attenuated by the at least a portion of the object as the object is simultaneously translated and rotated;
detect the radiation transmitted through the at least a portion of the object using at least one X-ray detector fixedly positioned with respect to the object and within the underground chamber; and
generate a signal representative of the transmitted radiation using the at least one X-ray detector.

* * * * *